United States Patent [19]

Qureshi et al.

[11] Patent Number: 5,060,842

[45] Date of Patent: Oct. 29, 1991

[54] METHOD FOR REFURBISHING NOZZLE BLOCK VANES OF A STEAM TURBINE

[75] Inventors: Javaid I. Qureshi, Winter Springs, Fla.; Michael E. Anderson, Sr., Winston-Salem, N.C.

[73] Assignee: Westinghouse Electric Corp., Pittsburgh, Pa.

[21] Appl. No.: 506,141

[22] Filed: Apr. 9, 1990

[51] Int. Cl.[5] .......... F01D 5/12; B23P 6/04; B23K 31/00

[52] U.S. Cl. .......... 228/119; 29/402.13; 29/888.011; 228/166

[58] Field of Search .......... 228/119, 166; 29/888.021, 888.011, 889.1, 402.13

[56] References Cited

U.S. PATENT DOCUMENTS

| | | | |
|---|---|---|---|
| 3,650,635 | 3/1972 | Wachtell et al. | 29/402.13 |
| 4,611,744 | 9/1986 | Fraser et al. | 29/889.1 |
| 4,832,252 | 5/1989 | Fraser | 228/119 |

OTHER PUBLICATIONS

Welding Handbook, 7th Ed., vol. 1, (1976) pp. 273 and 330.

Metals Handbook, 9th Ed., vol. 6, (1983) p. 291.

*Primary Examiner*—Kenneth J. Ramsey

*Attorney, Agent, or Firm*—K. Bach

[57] ABSTRACT

Nozzle block vanes having damaged trailing edge sections are repaired by removing the damaged section and replacing it by a new forged replacement trailing end section. The replacement section is coated with an erosion resistant coating leaving an uncoated border on three sides, preferably beveled. The coated section is welded to the vane and walls of the nozzle block and the weld portion ground to give a uniform contour between the vane and replacement section. The block is heat treated or the heat affected zone heat treated to provide a repaired vane.

10 Claims, 3 Drawing Sheets

FIG. 1
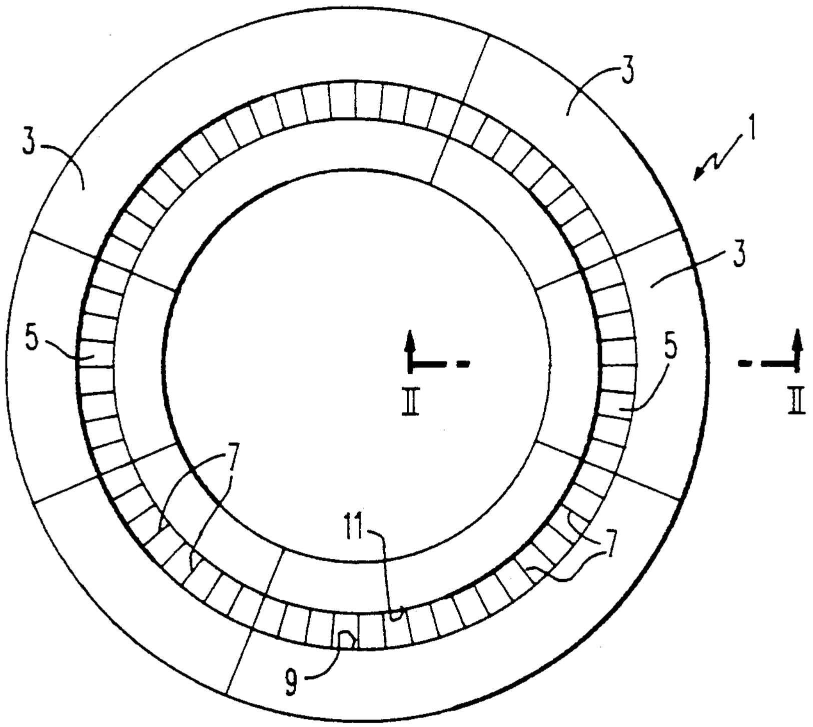
FIG. 2
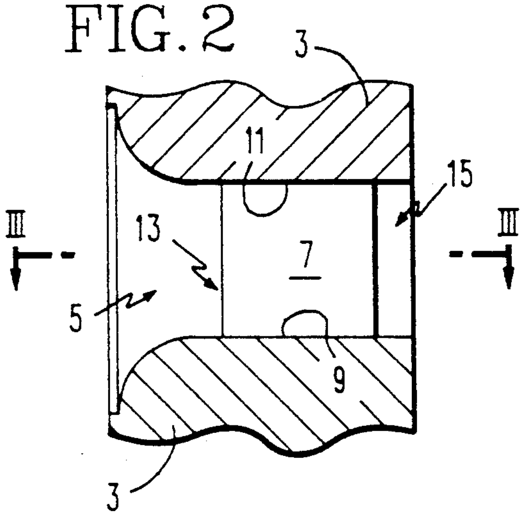
FIG. 3
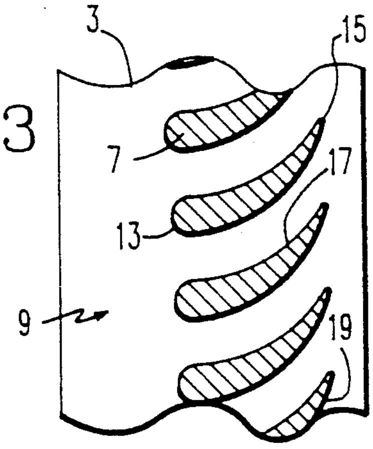
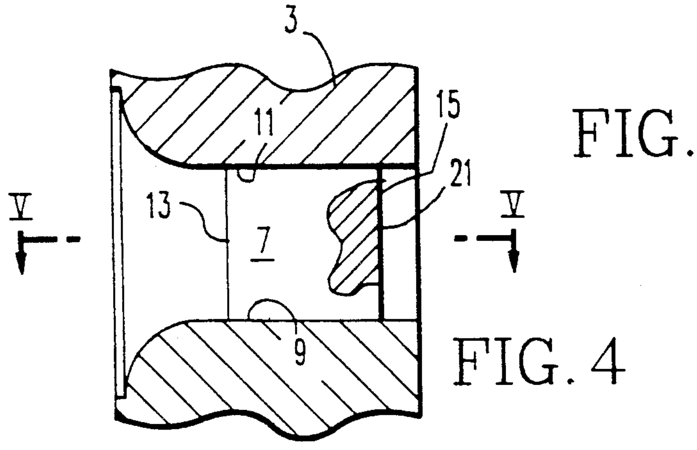
FIG. 4
FIG. 5
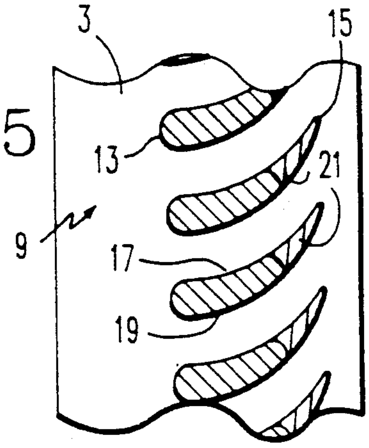

METHOD FOR REFURBISHING NOZZLE BLOCK VANES OF A STEAM TURBINE

FIELD OF THE INVENTION

The present invention is to a method of refurbishing nozzle block vanes and more specifically to refurbishing nozzle block vanes of a high pressure steam turbine by forming sections thereof from more rugged material.

BACKGROUND OF THE INVENTION

The nozzle block in a high pressure cylinder in a steam turbine is normally forged from an alloy, such as a 12 percent chromium steel, and is formed from a plurality of individual arc segments having a passage therethrough. A series of radially positioned airfoil vanes are situated in the passageway, to permit steam passage therethrough, which airfoil vanes are initially electric discharge machined from the forging. The vanes each have a leading edge (facing the steam inlet, or upstream) and a trailing edge (facing the outlet, or downstream).

The forged and electric discharge machined vanes sometimes become damaged during use by erosion caused by solid particles in the steam and/or by vibration which leads to fatigue damage (chipping). This damage results in metal being removed from the vanes and they then become thin and fragile. Such weakened vanes are subject to cracking, bending and subsequent breakage.

Attempts have been made to repair the vanes by weld repair of the vanes, to replace the damaged section with subsequent diffusion coating of the vanes, but were not successful. This is probably because of fatigue strength loss due to the welding and further fatigue strength loss due to the diffusion coating.

Since the machined nozzle block is large and expensive, damaged service exposed vanes are normally weld repaired rather than replacing the complete block. Conventional repair processes replace lost metal from a damaged section of a vane by depositing an alloy weld material, such as 12 percent chromium alloy weld material. Such a repair process presents problems including: (1) the extent of welding the trailing edge of the airfoil vane completely creates permanent defects, such as a loss of fatigue strength in the weld repaired portion, and possible inclusions, imperfections and underlying cracks can be undetectable; (2) hand welding and grinding can only restore the airfoil vane to 80-90 percent of its originally manufactured condition, since it is unrealistic to expect 100 percent as time constraints to get the nozzle block back into service as quickly as possible will not permit the period of time needed to restore the airfoil vane completely to original condition; (3) the repair process is very slow, during which time the turbine is out of operation; and (4) such a weld-repaired nozzle block is less rugged than the original forged metal, because the weld metal in presence of weld imperfections has less erosion resistance than a forged material, especially at the critically-stressed trailing edge of the vane and weld, because such metal contains a high content of delta ferrite, which reduces creep and fatigue strength of the airfoil vanes.

Some procedures for repairing turbine components have proposed the use of new sections of the component that are used to replace damaged sections. In U.S. Pat. No. 4,832,252, for example, a method of repairing turbine blades is disclosed that welds or brazes an insert of a material compatible with the material from which the blade is made, with replacement of a damaged portion of the blade by the insert. The insert is hardened at the outer end, while the inner end that is secured to the blade is substantially unaffected by the hardening. The insert is secured to the blade by welding or brazing, while using a weld or braze material of a relatively ductile nature to provide a cushion between the blade and the insert.

SUMMARY OF THE INVENTION

Nozzle block vanes of a steam turbine which have damaged trailing edge sections are refurbished or repaired by removing the damaged trailing edge section and replacing it with a new forged and machined trailing end section. The damaged trailing edge section of the vane is removed by grinding or cutting. A rectangular-shaped replacement trailing end section is forged and machined according to predetermined dimensions, that has a trailing end tip, an opposite end, and opposed side walls and is coated with an erosion resistant coating while leaving an uncoated border along three sides, except for the trailing end tip. The coated replacement trailing end section is placed adjacent the nozzle block with the uncoated end, opposite the trailing end tip, and the exposed end of the vane confronting each other. A fixture, formed from material such as copper, is used to locate precisely the vane components in the passageway of the nozzle block. The coated replacement trailing end section is then joined to the vane and the walls of the nozzle block along the uncoated border by an appropriate joining procedure.

Preferably, the uncoated border of the replacement trailing end section is beveled for better welding and the exposed end of the vane prior to welding is also beveled. Welding is preferably by gas tungsten arc welding, laser welding or electron beam welding, and the vane, or heat affected zone thereof, is heat treated after welding at a temperature of between about 1125°-1175° F. (607°-635° C.). After completion of the weld, the weld is ground to a uniform contour with the convex and concave forces of the vane.

The present method is also useful for forming a trailing end section on a shortened nozzle block vane to provide a strengthened vane of predetermined dimension.

BRIEF DESCRIPTION OF THE DRAWINGS

The invention will become more readily apparent from the following description of a preferred embodiment thereof shown, by way of example only, in the accompanying drawings, wherein:

FIG. 1 is a schematic illustration of a nozzle block containing airfoil vanes;

FIG. 2 is a sectional view taken along lines II—II of FIG. 1;

FIG. 3 is a sectional view taken along lines III—III of FIG. 2;

FIG. 4 is a view similar to that shown in FIG. 2 showing vanes with damaged edge sections that require repair;

FIG. 5 is a sectional view taken along lines V—V of FIG. 4;

DETAILED DESCRIPTION

Figure 6:
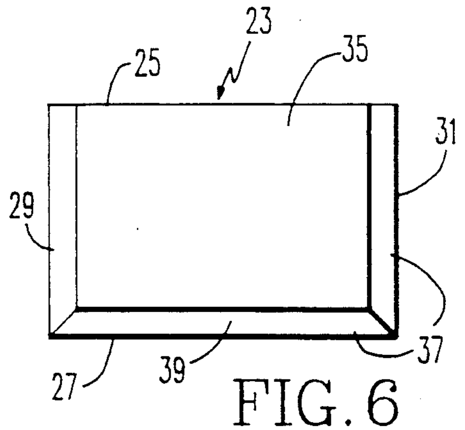
FIG. 6 is a plan view of a replacement trailing edge section, prior to coating, used in the method of the present invention.
Figure 7:
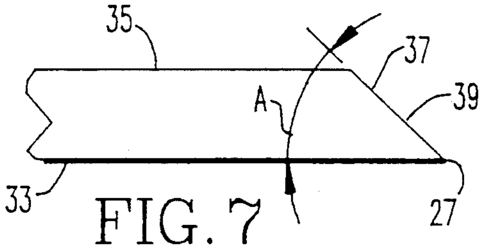
FIG. 7 is a view taken along lines VII—VII of FIG. 6.
Figure 8:
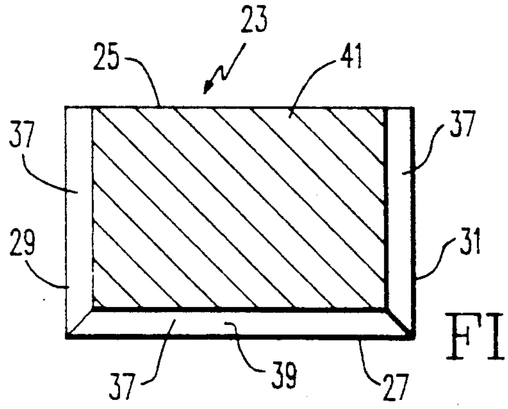
FIG. 8 is a plan view of a replacement trailing edge section, after coating, used in the method of the present invention.
Figure 9:
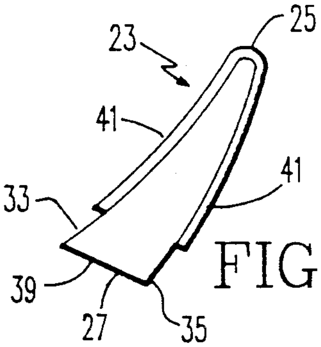
FIG. 9 is a sectional view of the replacement trailing end section illustrated in FIG. 8.

Referring now to FIG. 1, a steam turbine nozzle block 1 is illustrated which has a plurality of arcuate sections 3, that form a circular block having a passageway 5 through which steam is initially expanded in the steam turbine. The nozzle block 1 includes a plurality of stationary airfoil vanes 7 that control the expansion of the steam and impart the desired directional flow to the steam, prior to its entry into, and subsequent expansion through, further stages of the turbine system.

As shown in FIGS. 2 and 3, the vanes are positioned in the nozzle block 3, in passageway 5, with connections to an outer radial wall 9 and inner radial wall 11 facing the passageway 5. The airfoil vanes 7 have a leading edge 13 which faces the incoming steam (upstream end) and a trailing edge 15 which faces the outgoing steam (downstream end), and are curved, with a concave face 17 and a convex face 19, to provide the desired directional flow to the steam passing through the nozzle block 1. After a period of use in a steam turbine, the airfoil vanes 7, as illustrated in FIG. 4 and 5, are subjected to contact with steam and with any solid particles carried by the steam, as well as to vibration, which removes metal from the vanes 7, especially at the trailing edge 15 thereof to produce a damaged trailing edge section 21. The damaged trailing edge section 21, as illustrated in FIGS. 4 and 5, becomes thin and fragile and is subject to cracking, bending and subsequent breaking away from the airfoil vanes 7.

According to the present invention, a replacement trailing end section for the vanes is manufactured, the damaged trailing edge section of the vane removed, and new replacement trailing end section substituted therefor, or a trailing end section is joined to a shortened nozzle block vane, using a particular method.

The replacement trailing end section 23 is best described with reference to FIGS. 6-9, and comprises an arcuate, rectangular section, forged and machined to predetermined dimensions, having a trailing end tip 25, opposite end 27, and opposed side walls 29 and 31, the section having a concave face 33 and convex face 35. The outer portions of the opposite end 27 and opposed side walls 29 and 31 are beveled to provide a border 37 about three sides of the rectangular section. The bevel that is provided provides an acute angle A between the concave face 33 and the beveled surface 39 of the border of the replacement trailing end section 19. Preferably, the angle is one of about 45 degrees, and provides the area for welding of the replacement trailing end section to the nozzle block and airfoil vane.

In order to extend the life of the replacement trailing end section 23, an erosion resistant coating 41 is applied to the same to cover the concave end convex faces of the replacement trailing end section 23 as well as the trailing end tip 25, while leaving the border 37 uncoated. The erosion resistant coating is one that will withstand the environment to which the vane is exposed during operation of the turbine and may comprise a chromium carbide coating, tungsten carbide coating, cobalt base alloy coating or other such coating and having a thickness of between about 4–8 mil.

Figure 10:
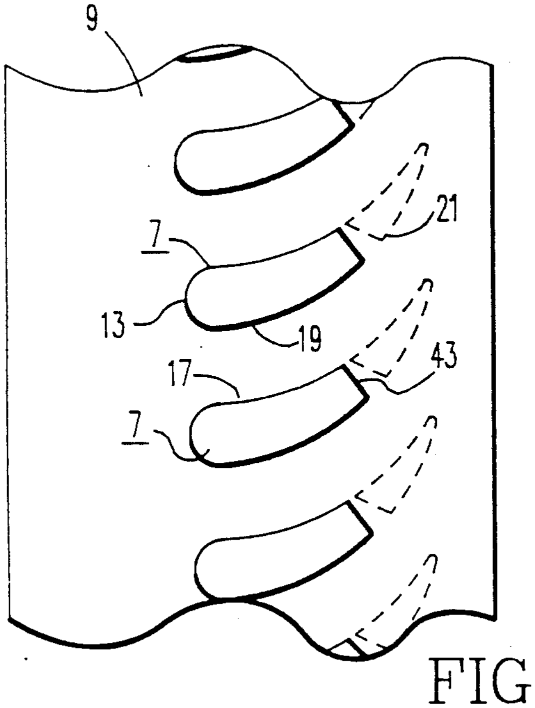
FIG. 10 schematically illustrates the airfoil vanes after removal of the damaged trailing edge sections (shown in phantom)

The damaged airfoil vane is prepared for addition thereto of the replacement trailing end section 23 by removing the damaged trailing edge section 21, such as by cutting with a laser or grinding away that damaged section. Such removal is schematically illustrated .in FIGS. 10 and 11, where the trailing edge 15, including damaged trailing edge section 21 (shown in phantom) have been removed. Such removal will provide an exposed end 43 on each of the airfoil vanes 7 and that exposed end 43 is preferably provided with a beveled surface 45, which beveled surface provides an acute angle B between the concave face 17 and the beveled surface 45 of the airfoil vane 7. This angle B is also preferably about 45 degrees, and provides the area for welding of the replacement trailing end section 23 thereto.

Figure 12:
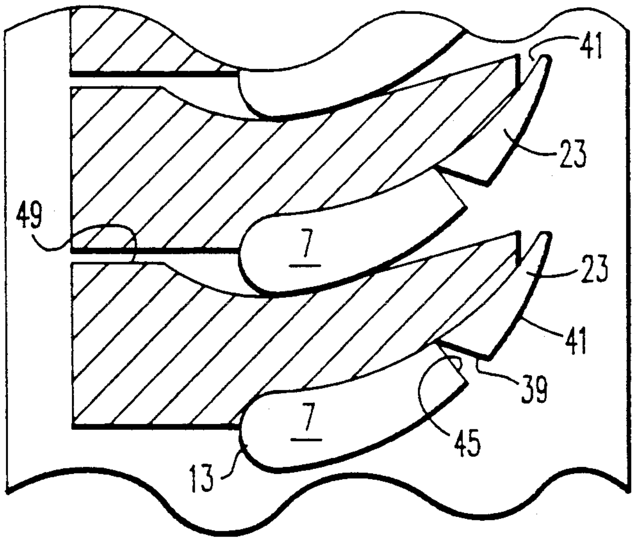
FIG. 12 is a schematic view of the placement of a replacement trailing end section and a vane with a damaged trailing edge section removed, positioned for welding.
Figure 13:
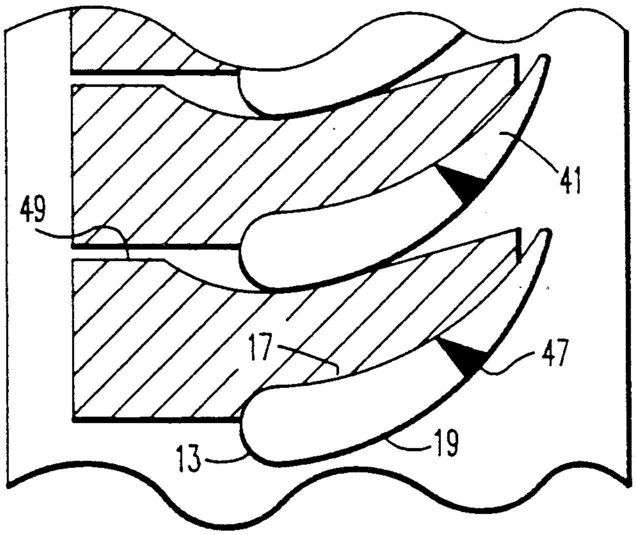
FIG. 13 is a view similar to FIG. 12 showing the weld.
Figure 14:
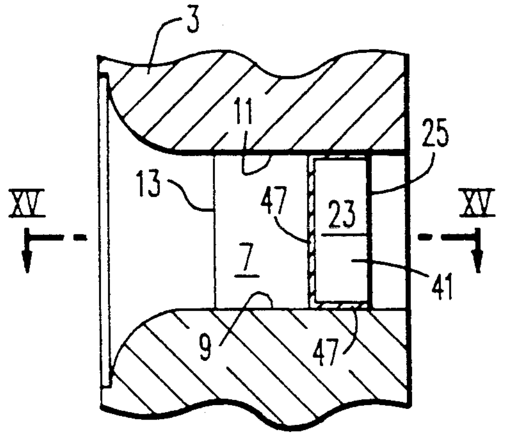
FIG. 14 is a view similar to FIG. 4 showing the replacement trailing end section welded to the vane and walls of the nozzle blocks.
Figure 15:
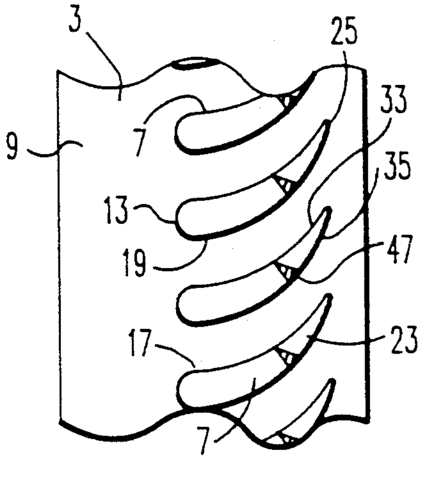
FIG. 15 is a sectional view taken along lines XV—XV of FIG. 14.

The replacement trailing end section 23 is joined to the airfoil vane 7 by welding. As shown in FIGS. 12 and 13, the coated replacement trailing end section 23 is positioned such that the beveled surface 39 confronts the beveled surface 45 of the exposed end 43 of the airfoil vane 7. The coated replacement trailing end section 23 is joined to the airfoil vane 7 and to the outer and inner walls 9 and 11 of the nozzle block 1 by gas tungsten arc welding, or laser or electron beam welding to form a weld portion 47, as illustrated in FIGS. 13–15. The welding is preferably effected while a backing fixture 49 of copper or other material is placed between adjacent vanes to provide support. The weld portions 47 are then ground to a uniform contour with the concave and convex faces 17, 19 of the vanes 7 and 33, 35 of the replacement trailing end section 23 either manually or by computer control, to provide a repaired vane substantially identical in shape to the original vane of the nozzle block. Finally, either the complete nozzle block 1 is heat treated at a temperature of between 1125° to 1175° F. (607°–635° C.), preferably at about 1150° F. (621° C.), or the local heat affected zone (HAZ) of said welded portion is heat treated with a laser process at said temperatures.

The present method provides for the repairing of damaged vanes by the use of new previously forged replacement trailing end sections which may be forged from the steel of identical composition, or a steel of higher fatigue strength than the original vane material and which are thus more rugged and have a higher fatigue strength than portions formed from a build-up of weld material. The replacement trailing end sections are further protected from erosion by an erosion resistant coating. Weld related problems are minimized by welding away from the critically stressed trailing edge of the vane and by minimizing the amount of welding that must be effected, with laser or electron beam welding improving weld deposit quality when used. Local stress relief by a laser will also aid in preventing block distortion problems.

Figure 11:
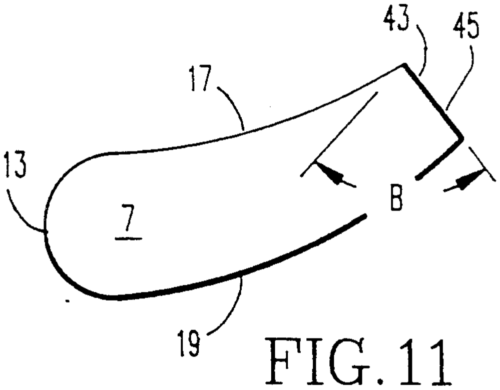
FIG. 11 is a view of that portion of FIG. 10 within the circle designated XI.

The present invention is also useful for forming a trailing end section of a nozzle block vane as an initial component. In such a method, a shortened nozzle block vane having an exposed end, similar to the shortened vane of FIG. 11 is provided and a trailing end section of predetermined dimensions is provided and joined to the shortened nozzle block vane. The joining procedure for joining the trailing end section of a nozzle block vane to the shortened nozzle block vane is the same as that used to join a trailing end section to a nozzle block vane that has a damaged trailing edge section removed therefrom.

What is claimed is:

1. A method for refurbishing a nozzle block vane having an initial contour, with a concave face, and a damaged trailing edge section, secured to the walls of a passageway through a nozzle block, comprising:

removing the damaged trailing edge section from the nozzle block vane so as to provide an exposed end and a bevel that forms an acute angle from said concave face;

providing a replacement trailing end section of predetermined dimensions, having a concave face, a trailing end tip, opposite end, and opposed side walls, for said nozzle block vane said replacement trailing end section provided with a bevel that forms an acute angle from said concave face;

coating said replacement trailing end section with an erosion resistant coating while leaving an uncoated border along said opposite end and opposed side walls thereof;

positioning said coated replacement trailing end section adjacent the nozzle block vane with the uncoated opposite end of the replacement trailing end section confronting the exposed end of the nozzle bock vane; and joining the uncoated opposite end of the replacement trailing end section to the exposed end of the nozzle block vane and the opposed side walls to the walls of the nozzle block to produce a repaired nozzle block vane having the same contour as that of the initial contour.

2. A method for refurbishing a nozzle bock vane having concave and convex faces and an initial contour and a damaged trailing edge section, secured to the walls of a passageway through a nozzle block, comprising:

removing the damaged trailing edge section from the nozzle block vane so as to provide an exposed end provided with a bevel that forms an acute angle with the concave face thereof;

providing a replacement trailing end section, having a concave face, a trailing end tip, opposite end, and opposed side walls, for said nozzle block vane said replacement trailing end section provided with a bevel that forms an acute angle with said concave face;

coating said replacement trailing end section with an erosion resistant coating while leaving an uncoated border including said bevel that forms an acute angle with the concave face thereof along said opposite end and opposed side walls thereof;

positioning said coated replacement trailing end section adjacent the nozzle block vane with the uncoated opposite end of the replacement trailing end section confronting the exposed end of the nozzle block vane.

joining the uncoated opposite end of the replacement trailing end section to the exposed end of the nozzle block vane and the opposed side walls to the walls of the nozzle block to form a weld portion thereof; and grinding said weld portion to a uniform contour with the concave and convex faces of the vane and replacement trailing end section to produce a repaired nozzle block vane having the same contour as that of the initial contour.

3. A method for forming a trailing end section on a nozzle block vane having an initial contour secured to the walls of a passageway through a nozzle block, comprising:

providing a shortened nozzle block vane with a concave face having an exposed end provided with a bevel that forms an acute angle with said concave face;

providing a trailing end section of predetermined dimensions, having a concave face, a trailing end tip, opposite end, and opposed side walls, for said nozzle block vane said trailing end section provided with a bevel that forms an acute angle with said concave face;

coating said trailing end section with an erosion resistant coating while leaving an uncoated border along said opposite end and opposed side walls thereof;

positioning said coated trailing end section adjacent the shortened nozzle block vane with the uncoated opposite end of the trailing end section confronting the exposed end of the shortened nozzle block vane; and joining the uncoated opposite end of the trailing end section to the exposed end of the shortened block vane and the opposed side walls to the walls of the nozzle block to produce a nozzle block vane having a contour complementary to that of the contour of the shortened nozzle block vane.

4. The method as defined in claim 1 wherein the bevel on the exposed end of said trailing edge section is about 45 degrees.

5. The method as defined in claim 1 wherein the bevel on the replacement trailing end section is about 45 degrees.

6. The method as defined in claim 1, wherein the removal of the damaged trailing edge section from the nozzle block vane is by laser cutting or grinding.

7. The method as defined in claim 1, wherein said joining is effected by gas tungsten arc welding, laser welding, or electron beam welding.

8. The method as defined in claim 7, wherein said welding forms a weld portion on said vane and the weld portion is ground to an uniform contour with the concave and convex faces of the vane and replacement trailing end section.

9. The method as defined in claim 8, wherein the local heat affected zone of said welded portion is heat treated at a temperature between 1125°-1175° F.

10. The method as defined in claim 8, wherein said nozzle block, after said welding, is heat treated at a temperature of between 1125°-1175° F.

* * * * *